United States Patent [19]

Rodger et al.

[11] Patent Number: 5,727,775
[45] Date of Patent: Mar. 17, 1998

[54] GATE VALVE WITH DUAL SEAL RINGS ON A UNITARY SEAT RING

[75] Inventors: John E. Rodger, San Antonio; Randle E. Ford, New Braunfels, both of Tex.

[73] Assignee: Baker Hughes Incorporated, Houston, Tex.

[21] Appl. No.: 587,590

[22] Filed: Jan. 17, 1996

[51] Int. Cl.$^6$ .................................................. F16K 3/00
[52] U.S. Cl. ................................ 251/328; 251/172
[58] Field of Search ........................... 251/326, 328, 251/359, 170, 171, 172; 277/188 A

[56] References Cited

U.S. PATENT DOCUMENTS

| | | | |
|---|---|---|---|
| 3,071,343 | 1/1963 | Milleville | 251/328 |
| 3,752,178 | 8/1973 | Grove | 137/246.22 |
| 3,765,647 | 10/1973 | Grove | 251/328 |
| 4,163,544 | 8/1979 | Fowler | 251/328 |
| 4,434,967 | 3/1984 | Vanderburg | 251/328 |
| 5,039,063 | 8/1991 | Louch | 251/328 |
| 5,090,661 | 2/1992 | Parks, Jr. et al. | |
| 5,169,125 | 12/1992 | Bailey | |
| 5,232,199 | 8/1993 | Thrasher | 251/328 |
| 5,341,835 | 8/1994 | Lanning | 251/328 |

OTHER PUBLICATIONS

"Introducing Baker's Latest Gate Valve—with a Twist", Baker Oil Tools Brochure, 1 pg.
"Model 'BTC' and 'BTCO$_2$' Gate Valve", 1pg.
"Model 4000 D–Seal Gate Valve", Foster Brochure, 6 pp.

*Primary Examiner*—Denise L. Feresnic
*Assistant Examiner*—Ramyar M. Farid
*Attorney, Agent, or Firm*—Browning Bushman

[57] ABSTRACT

The gate valve 10 suitable for controlling fluid flow into a gas injection well of a hydrocarbon recovery operation includes a thru-conduit valve body 12, a bonnet 30, an operator handle 36 for raising and lowering a gate 22. A pair of seat assemblies 26, 28 are provided on opposing sides of the gate. Each seat assembly seals with a planar face of the gate, and includes a metal seat ring 56 and a pair of concentric face seals 70 and 72 supported on the seat ring. The seal rings are fabricated from a selected plastic material, and may be easily removed and reinstalled on the seat ring for customizing the gate valve for specific applications, and for reduced maintenance. The seat ring 56 is configured to facilitate its removal from the valve body.

13 Claims, 1 Drawing Sheet

GATE VALVE WITH DUAL SEAL RINGS ON A UNITARY SEAT RING

FIELD OF THE INVENTION

The present invention relates to a gate valve of a type commonly used to control fluid flow when servicing a hydrocarbon recovery well. More particularly, this invention relates to a thru-conduit gate valve with dual seal rings each supported on a seat ring.

BACKGROUND OF THE INVENTION

Gate valves are commonly used to control fluid flow, and are frequently the valves selected for use in gas injection wells to enhance the recovery of hydrocarbons. $CO_2$ is commonly injected into wells for improving hydrocarbon recovery, and gate valves are typically provided for controlling $CO_2$ injection. Thru-conduit gate valves have a thru-opening in the body corresponding to the diameter of the upstream and downstream conduit lines, and are frequently preferred over other types of gate valves. One type of thru-conduit gate valve is disclosed in U.S. Pat. No. 5,169,125.

In recent years, gate valves are being used in more corrosive and erosive environments. In critical service wells, for example, the demands on reliable operation of gate valves are increasing even though the valves are simultaneously being used on more highly corrosive and erosive fluids. One of the most common maintenance problems with gate valves is leakage between the gate and the seat ring seals positioned on opposing sides of the gate. Various techniques have been proposed to increase sealing reliability between the seat ring and the gate, including complex mechanisms which utilize biasing springs to force the seat rings into engagement with the gate, and seat rings with dual seal rings each carried by structurally separate seat ring supports.

One of the proposals for reducing maintenance on a thru-conduit gate valve utilizes a primary pressure seal carried on a seat ring, and a secondary seal ring carried on another ring movable independently of the primary seat ring and spaced radially inward thereof. The second seat ring is biased by a leaf spring for engagement with the gate. This design, while benefiting from dual seal rings, is operationally complex and is susceptible to failure in critical service applications. The metal bias ring may be subjected to corrosive and erosive fluids, thereby causing failure of the seat ring and thus leakage past the valve. This gate valve is described in U.S. Pat. No. 5,090,661.

Other gate valve designs utilize complex mechanisms for forcing the seat ring into sealing engagement with the gate. Some seat rings are fragile and cost several hundred dollars. Still other designs utilize seal rings which are installed on the seat ring and the face of the seat ring machined so that the seal ring is reliably retained within the seat ring. These designs increases manufacturing costs, and complicates replacement of the seal ring. Many gate valves require extremely high torque to slide the gate with respect to the seat rings during actuation of the valve. The need exists for reliable and cost efficient gate valve which may be used in various applications for reliably sealing between the seat rings and the gate, and which is operational under a relatively low operating torque.

The disadvantages of the prior art are overcome by the present invention, and an improved gate valve is hereinafter disclosed which utilizes dual seal rings mounted on a unitary seat ring. The gate valve of the present invention may be used in various applications, and is particularly well suited for gas injection wells in hydrocarbon recovery operations.

SUMMARY OF THE INVENTION

The gate valve according to this invention may be used for controlling the flow of fluids to a gas injection well of a hydrocarbon recovery operation. The gate valve may thus be subject to a pressure of up to 3700 psi and to fluid temperatures up to about 450° F. The gate valve comprises a thru-conduit valve body and a gate movable by a handle in a direction substantially perpendicular to the thru-axis of the valve body. The gate comprises opposing planar faces which each seal with a respective seat ring assembly when the gate valve is closed. Each seat ring assembly includes a metal seat ring, a radial seal for static sealing between the seat ring and the valve body, and a pair face seals each supported on the metal seat ring and concentric with the thru-axis of the valve body. The radial outer face seal is a low pressure seal preferably formed from a relatively soft material, such a polytetrafluroethylene. The radially inner seal is formed from a relatively hard plastic material, such a polyester ether ketone, and is tough, durable and corrosion resistant. Both seals have a low coefficient of friction with the respective planar gate face, thereby resulting in a low operating torque. The seat ring may also include a back side O-ring on the seat ring surface opposite the face seals for pressing the seat ring toward the gate for low pressure sealing.

Each face seal fits within a respective primary groove in the seat ring having a generally rectangular configuration, and a radial or pocket groove extending off the primary groove. The seal has a similar rectangular configuration with a radial shoulder that fits within the pocket groove to lock the seal in place on the seat ring. The face of the seal preferably extends beyond the face of the seat ring by a stand-off distance of from 0.02 to 0.07 inches. The seat ring is designed for easy removal from the valve body. A relief cut is formed in the radially outer surface of the seat ring for facilitating seat ring removal with a conventional screwdriver. Each seal may be easily replaced in the seat ring by snapping out the old seal and pressing in a new seal.

It is an object of the present invention to provide an improved gate valve with a seat ring assembly which reliably seals with the face of the gate. The seat ring assembly comprises a seat ring including a pair of face seals thereon, with each face seal being easily removed from and fitted into a respective groove within the seat ring so that the face seals may be selected for the particular application. By utilizing two face seals, the sealing area is increased, and the face seals cooperate to extend the useful life of the gate valve.

It is a feature of the present invention that the radially outer seal be formed from a relatively soft material for low pressure sealing, and that the radially inner seal be formed from a relatively hard and durable plastic material. Each face seal preferably extends from the face of the seat ring by a selected stand-off distance. A low coefficient of friction between the face seal and the planar surface of the gate results in a low operating torque for the gate valve. An elastomeric O-ring may be used to bias the seat ring toward engagement with the gate under low, fluid pressure conditions. As the fluid pressure to the valve increases, the higher pressure increases sealing effectiveness with the gate.

A significant advantage of this invention is the relatively low cost associated with customizing the gate valve by selecting each of the pair of face seals depending on anticipated application conditions. Gate valve maintenance costs are also reduced since each seat ring may be easily removed from the valve body, and the face seals on the seat ring easily replaced.

These and further objects, features and advantages of the present invention will become apparent from the following detailed description, wherein reference is made to the figures in the accompanying drawings.

DETAILED DESCRIPTION OF PREFERRED EMBODIMENTS

Figure 1:
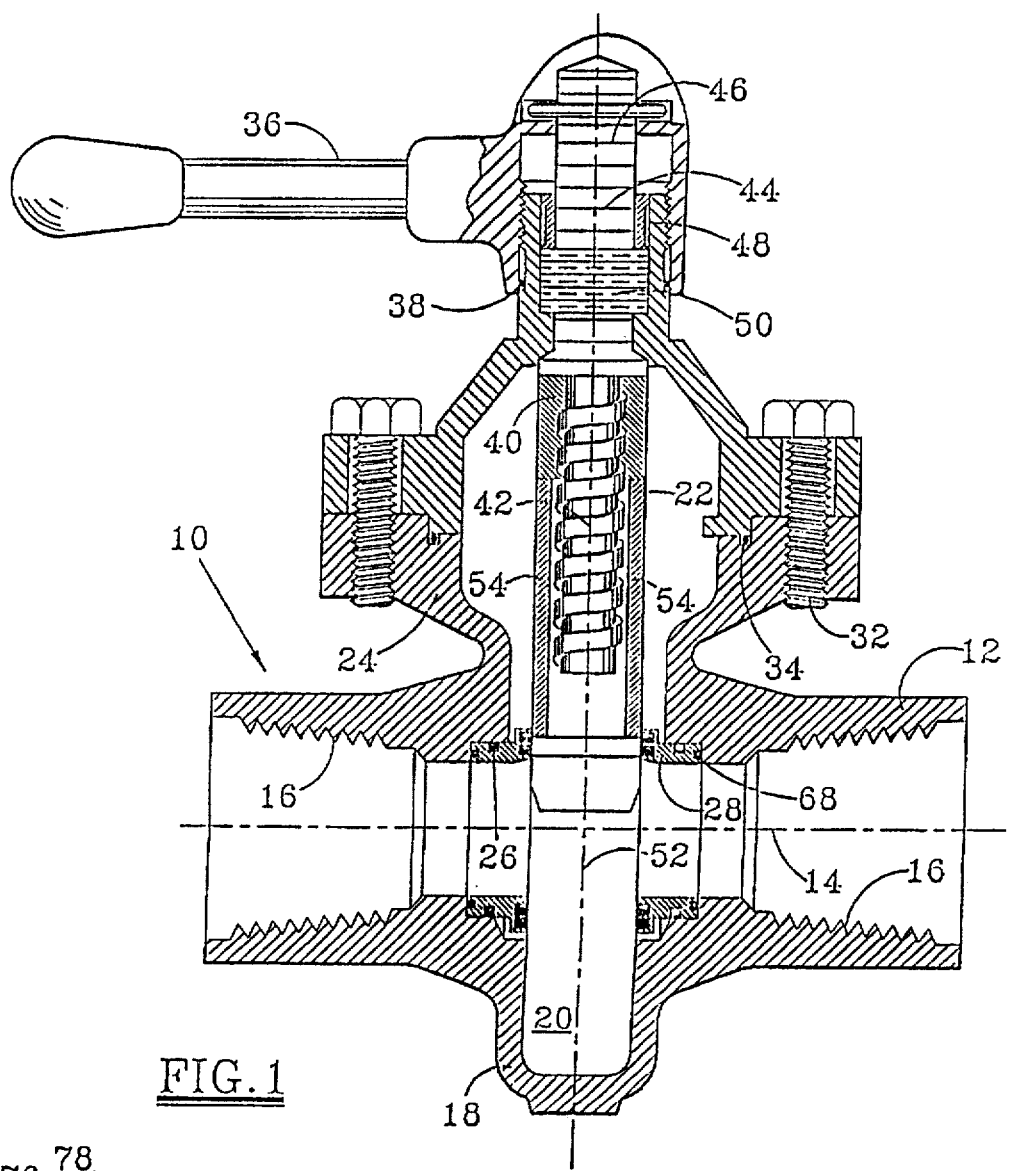
FIG. 1 is a side view, partially in cross-section, of a suitable thru-conduit gate valve according to the present invention.

FIG. 1 discloses a thru-conduit gate valve 10 according to the present invention. The gate valve includes a valve body 12 having a thru-conduit central axis 14. Each end of the valve body includes threads 16 for mated connection with conventional tubulars. If desired, those skilled in the art will appreciate that the ends of the valve body may be designed for ranged interconnection, grooved end interconnection, butt weld, or other conventional interconnections with tubulars. The valve body 12 thus defines a generally cylindrical flow path 13 therein concentric with axis 14 and both sized and aligned with the flow path in both the upstream and downstream conduits connected to the valve body.

The valve body includes a lower valve body portion 18 forming a pocket 20 for receiving the gate 22 when the gate valve is in the closed position. An upper body portion 24 is configured for easy removal of the opposing seat assemblies 26 and 28, as described further below. A bonnet 30 is removably interconnected with the valve body by a plurality of circumferentially spaced securing members 32, which may comprise either bolts or stud and nut members. A static O-ring seal 34 seals between the bonnet and the valve body. The handle 36 is mounted on the bonnet 30, and is sealed therewith by an O-ring 38. If desired, a plurality of handles may be circumferentially arranged about the gate axis 52 to facilitate closing of the gate valve by an operator.

A T-nut 40 cooperates with lower stem portion 42 to raise and lower the gate 22 along the gate axis 52 in a conventional manner. The stem 44 is also provided with a role pin 46. A retaining nut 48 is threaded to the upper end of the bonnet 30, and presses downward on Chevron packing 50 to reliably seal between the stem and the upper portion of the bonnet 30. With the exception of the seat rings described below, the gate valve of the present invention may be similar to the Model BTC Gate Valve marketed by Baker SPD.

Each seat ring assembly 26, 28 may be identical in design and construction, and accordingly only seat ring 26 for sealing engagement with face 54 of the gate 22 is discussed in detail below. Seat ring 26 comprises a metal seat ring 56 having a radially inner shoulder 58 which defines a circumferential bore through the seat ring, and a radially outer surface 60 which is sealed with the body 12 by a conventional O-ring 62. The bore through the seat ring is substantially the same diameter as the cylindrical flow path 13 through the valve body. The seat ring 56 has a unitary construction, i.e., the metal seat ring itself has no moving parts. The seat ring 56 is also preferably monolithic since it is formed from a single piece of metal stock. The gate facing surface 64 of seat ring 26 is parallel to the gate surface 54, and the opposing end surface 66 of the seat ring engages the stop surface 68 and the valve body (see FIG. 1).

Figure 2:
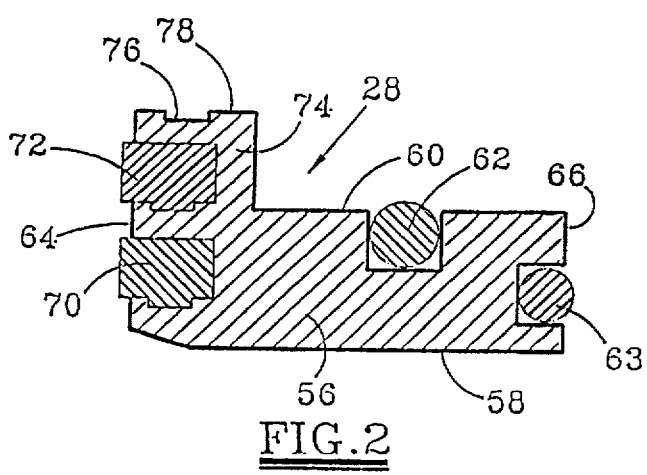
FIG. 2 is a cross-sectional view through the gate valve seat ring assembly generally shown on FIG. 1.

A radially inner seal ring 70 and a radially outer seal ring 72 are each supported on the seat ring 56. The radially outer shoulder 74 on the seat ring is sized so that the seat ring may support both seal rings, as shown. Relief cut 76 on the outer surface 78 of the shoulder 74 is provided for receiving the end of a screwdriver or other conventional tool to easily pry the seat assembly from its position on the valve body as shown in FIG. 2. Securing members 32 may thus be unthreaded to remove the bonnet 30 and the gate 22 from the valve body, then the seat assemblies 26 and 28 easily removed from the valve body.

Figure 3:
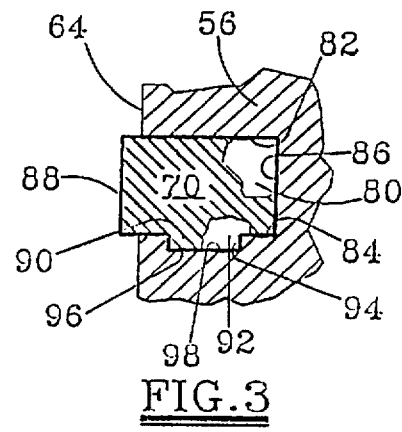
FIG. 3 is an expanded view illustrating one of the face seals installed within a groove in the seat ring.

FIG. 3 illustrates in greater detail the elastomeric material sealing ring 72 shown in FIG. 2. Each of the seal rings 70 and 72 may be identical in cross-sectional configuration, although the seal ring materials are preferably different. The outer seal ring 72 is formed for low pressure sealing of the seat ring with the gate, and is fabricated from a relatively soft elastomeric material, such as polytetrafluroethylene (TFE). The inner seal ring 70 is formed from a harder and more durable corrosion resistant plastic material, such as polyester ether ketone (PEEK™). Each seal ring is mounted on the same unitary seat ring 56, and has an axis concentric with axis 14.

The seal ring 72 has a generally rectangular configuration, and fits within a similarly configured groove 80 formed by sidewalls 82 and 84 within the seat ring each parallel to axis 14, and base 86 perpendicular to the sidewalls. The seal ring 70 has a face 88 parallel to the surface 54 of the gate 22, and extends from the surface 64 of the seat ring a selected distance of from 0.02" to 0.07", and preferably about 0.05". A rectangular-shaped shoulder 90 of the seal ring 72 extends radially outward from axis 14, and fits within a similarly configured groove 92 having walls 94 and 94 each perpendicular to axis 14, and having base 98 parallel to axis 14. The seal rings 70 and 72 are each configured for being reliably retained on the seat ring 56, which is a function primarily served by the annular shoulder 90. The seal rings are also designed for easy removal and installation on the seat ring, thereby allowing each seat ring assembly to be customized for a particular application by selecting a seal ring material for that application. Easy replacement of the seat ring also reduces maintenance costs for the gate valve.

Each seal ring may be removed from the seat ring by prying a screwdriver between the seat ring and the seal ring, and snapping each seal ring partially out of the groove, then pulling on the partially removed seal ring to pull the entire seal ring from its groove. A new seat ring may be easily installed by pressing a portion of the new seal ring against the side surface 82 and the base surface 86, then continuing to press the seal ring against the surfaces 82 and 86 until the shoulder 90 snaps within the groove 92. Once a portion of the seal ring is fitted within the groove, the entire seal ring may be pressed into the groove by applying pressure to the seal ring with a thumb, a piece of wood, or other available tool while slowly moving around the circumference of the seat ring as the seal ring is forced into its corresponding groove. In an alternative embodiment, the inner seal ring 70 and the groove in the seat ring for receiving the inner seal ring may have a reduced size holder, since a formation of this seal ring for insertion into the groove with a seal ring shoulder and corresponding side groove would be more difficult due to the harder material for the seal ring. Still a further embodiment, the inner seal ring and the inner groove may not have any shoulder, so that both the seal ring and the groove each have a rectangular cross-sectional configuration. Also, the radial thickness of the inner groove may be slightly less than the radial thickness of the more elastic outer seal ring.

Some applications, particularly when reliable sealing between the seal ring assembly and the gate is required when there is very low fluid pressure on the gate, elastomeric O-ring 63 may be provided on the surface 65 of the seat ring axially opposing the gate facing surface 64 of the seat ring. Since it is not required that the seal ring 63 seal between the seat ring and the valve body, the O-ring 63 may be split along its circumferential length. The purpose of the elastomeric O-ring 63 is to provide a small biasing force for pushing each seat ring axially in a direction toward engagement with the gate, thereby giving low pressure sealing between the seat ring assembly and the gate when fluid pressure in the valve is low. As fluid pressure in the valve increases, the increased fluid pressure will act on the rear surface 65 of the seat ring to hydraulically force each seat ring assembly toward engagement with the gate.

The valve operator for selectively raising and lowering the gate within the valve body to open and close the valve may be a manually operated handle as disclosed herein, which rotates a valve stem and, in cooperation with the T-nut 40, raises and lowers the gate. Those skilled in the art will appreciate that other valve operators may be used for raising and lowering the gate, including powered operators for large gate valves.

The foregoing disclosure and description of the invention is illustrative and explanatory thereof, and it will be appreciated by those skilled in the art that various changes in the size, shape and materials as well as in the details of the illustrated construction or combinations of features of the various system elements and the method discussed herein may be made without departing from the spirit of the invention.

What is claimed is:

1. A gate valve for controlling fluid flow, comprising
a valve body having a thru-bore for passing fluids through the gate valve;
a gate slidably movable within the valve body and having a planar face;
a valve operator for selectively moving the gate within the valve body to open and close the gate valve;
and an annular seal ring assembly for sealing with a planar surface of the gate when the gate valve is closed, the annular seal ring assembly including a unitary metal monolithic seat ring, a radially outer elastomeric material seal ring form fitted within a radially outer groove in the seat ring for sealing engagement with the planar face of the gate, and a radially inner elastomeric material seal ring form fitted within a radially inner groove in the seat ring for sealing engagement with the planar face of the gate, the inner groove and the outer groove being configured to be spaced apart and the radially inner seal ring being fabricated from a hard elastomeric material and the radially outer seal ring being fabricated from a soft elastomeric material, each of the radially outer groove and the radially inner groove having a radially extending side pocket in communication with a main pocket of each respective groove, the main pocket of each respective groove being substantially rectangular in cross-section and the corresponding seal ring being configured prior to being form fitted on the seat ring to include a main seal body that is substantially rectangular in cross-section for form fitting within the main pocket;
and a side extension for form fitting within the side pocket and positioned such that no planar contact is made with the gate, the side pocket being smaller in cross-sectional area than the main pocket.

2. The gate valve as defined in claim 1, wherein the side extension of each seal ring has a substantially rectangular cross-sectional configuration for fitting within the side pocket of the corresponding groove.

3. The gate valve as defined in claim 1, wherein each radially extending side pocket extends radially inward from the main pocket of each respective groove, and wherein the side extension extends radially inward from the corresponding main body for fitting within the corresponding side pocket.

4. The gate valve as defined in claim 1, wherein each of the radially outer seal ring and radially inner seal ring extend outward from a face of the seat ring by spacing of from 0.02 to 0.07 inches.

5. The gate valve as defined in claim 1, wherein the seat ring has a relief cut in a radially outer surface of the seat ring and extending radially only partially through the seat ring for facilitating removal of the seat ring from the valve body.

6. A gate valve for controlling fluid flow, comprising
a valve body having a thru-bore for passing fluids through the gate valve,
the thru-bore having a central bore axis;
a gate slidably movable within the body along a gate axis substantially perpendicular to the central bore axis and having first and second opposing planar faces;
a valve operator for selectively moving the gate within the valve body to open and close the gate valve;
first and second annular seal ring assemblies for sealing with respective one of the first and second planar surfaces of the gate when the gate valve is closed;
and each of the first and second annular seal ring assemblies including a unitary metal monolithic seat ring, a radially outer elastomeric material seal ring form fitted within a radially outer groove in the seat ring for sealing engagement with the planar face of the gate, a radially inner elastomeric material seal ring form fitted within a radially inner groove in the seat ring for sealing engagement with the planar face of the gate, the inner groove and the outer groove being configured to be spaced apart and the radially inner seal ring being fabricated from a hard elastomeric material and the radially outer seal ring being fabricated from a soft elastomeric material, and a radial seal for sealing between the seat ring and the valve body, each of the radially outer groove and the radially inner groove having a radially extending side pocket in communication with a main pocket of each respective groove, the main pocket of each respective groove being substantially rectangular in cross-section, and the corresponding seal ring being configured prior to being form fitted on the seat ring to include a main seal body that is substantially rectangular in cross-section for form fitting within the main pocket;
and a side extension for form fitting within the side pocket and positioned such that no planar contact is made with gate, the side pocket being smaller in cross-sectional area than the main pocket.

7. The gate valve as defined in claim 6, wherein:
each seat ring has a relief cut in a radially outer surface of the seat ring and extending radially only partially through the seat ring for facilitating removal of the seat ring from the valve body.

8. The gate valve as defined in claim 6, wherein each of the radially outer seal rings extends outward from a face of the respective seat ring by spacing of from 0.02 to 0.07 inches.

9. The gate valve as defined in claim 6, wherein each radially extending side pocket extends radially inward from the corresponding main pocket of the corresponding groove, and wherein each side extension extends radially inward from the main body for fitting within the side pocket.

10. The gate valve as defined in claim 6, wherein the side extension of each seal ring has a substantially rectangular cross-sectional configuration for fitting within the corresponding side pocket of the groove.

11. A seal ring assembly for sealing with a planar surface of a gate movable within a gate valve, the gate having a planar face, the seal ring assembly comprising:

a unitary metal monolithic seat ring, the seat ring including a radially outer groove having an outer main pocket that is substantially rectangular in cross-section and an outer side pocket extending radially from the outer main pocket, and a radially inner groove having an inner main pocket that is substantially rectangular in cross-section and a inner side pocket extending radially from the inner main pocket, both the inner side pocket and the outer side pocket having smaller cross-sectional areas than the corresponding main pockets, and the radially outer groove and the radially inner groove being configured to be spaced apart radially;

a radially outer soft elastomeric material seal ring form fitted within the radially outer groove in the seat ring for sealing engagement with the planar face of the gate, the radially outer soft elastomeric seal ring having an outer seal main body that is substantially rectangular in cross-section and configured to form fit within the outer main pocket prior to placing in the outer main pocket and an outer seal side projection extending from the outer seal main body that is configured to form fit within the outer side pocket prior to placing in the outer side pocket and positioned in the outer side pocket such that the outer seal side projection has no contact with planar face of gate;

a radially inner hard elastomeric material seal ring form fitted within a radially inner groove in the seat ring for sealing engagement with the planar face of the gate, the radially inner hard elastomeric seal ring having an inner seal main body that is substantially rectangular in cross-section and configured to form fit within the inner main pocket prior to placing in the inner main pocket and an inner seal side projection extending from the inner seal main body that is configured to form fit within the inner side pocket prior to placing in the inner side pocket and positioned in the inner side pocket such that the inner seal side projection has no contact with planar face of gate;

a radial seal for sealing between the seat ring and a valve body of the gate valve;

and a biasing member for pushing the seat ring axially in a direction toward engagement with the gate thereby giving low pressure sealing between the seat ring assembly and the gate when fluid pressure in the valve is low.

12. The seal ring assembly as defined in claim 11, wherein:

the seat ring has a relief cut in a radially outer surface of the seat ring and extending radially only partially through the seat ring for facilitating removal of the seat ring from the valve body.

13. The seal ring assembly as defined in claim 11, wherein the side extension of the seal ring has a substantially rectangular cross-sectional configuration for fitting within the corresponding side pocket of the groove.

* * * * *

UNITED STATES PATENT AND TRADEMARK OFFICE
CERTIFICATE OF CORRECTION

PATENT NO. : 5,727,775
DATED : March 17, 1998
INVENTOR(S) : Rodger et al.

It is certified that error appears in the above-indentified patent and that said Letters Patent is hereby corrected as shown below:

In col. 7, lines 14 & 15, delete "corresponding" after "fitting within the".

In col. 7, line 15, before "groove" insert --corresponding--.

Signed and Sealed this

Twenty-first Day of July, 1998

*Attest:*

BRUCE LEHMAN

*Attesting Officer*      *Commissioner of Patents and Trademarks*